(12) United States Patent
Nakamoto

(10) Patent No.: US 11,588,953 B2
(45) Date of Patent: Feb. 21, 2023

(54) IMAGE PROCESSING APPARATUS, CONTROL METHOD, AND COMPUTER PRODUCT FOR ARRANGING AN IMAGE AND SETTING A CROP MARK DISPLAYED IN A PRINTABLE AREA

(71) Applicant: CANON KABUSHIKI KAISHA, Tokyo (JP)

(72) Inventor: Hiroshi Nakamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/701,486

(22) Filed: Mar. 22, 2022

(65) Prior Publication Data

US 2022/0321731 A1 Oct. 6, 2022

(30) Foreign Application Priority Data

Mar. 30, 2021 (JP) .............................. JP2021-058495

(51) Int. Cl.
*H04N 1/387* (2006.01)
*H04N 1/393* (2006.01)
*H04N 1/00* (2006.01)

(52) U.S. Cl.
CPC ....... *H04N 1/3873* (2013.01); *H04N 1/00411* (2013.01); *H04N 1/00456* (2013.01); *H04N 1/00466* (2013.01); *H04N 1/00482* (2013.01); *H04N 1/393* (2013.01)

(58) Field of Classification Search
None
See application file for complete search history.

(56) References Cited

U.S. PATENT DOCUMENTS

| | | | | |
|---|---|---|---|---|
| 7,336,912 B2* | 2/2008 | Yamauchi | ............ | G03G 15/502 399/83 |
| 7,839,512 B2* | 11/2010 | Kotani | .................. | G06K 15/00 345/11 |
| 7,961,200 B2* | 6/2011 | Walker, Jr. | .............. | G06T 11/60 345/620 |
| 9,135,733 B2* | 9/2015 | Matsumoto | ........... | G06F 3/0484 |
| 9,917,957 B1* | 3/2018 | Martin | .................. | G06F 3/1284 |
| 10,970,017 B2* | 4/2021 | Nakamoto | ............ | G06F 3/1285 |
| 11,064,082 B2* | 7/2021 | Nakamoto | ......... | H04N 1/00676 |
| 2022/0317954 A1* | 10/2022 | Sekine | ............... | H04N 1/00501 |

FOREIGN PATENT DOCUMENTS

JP   2012058303 A   3/2012

* cited by examiner

*Primary Examiner* — Scott A Rogers
(74) *Attorney, Agent, or Firm* — Canon U.S.A., Inc. IP Division

(57) ABSTRACT

A control method for an image processing apparatus includes displaying a display area that includes a printable area corresponding to an area to be printed on a recording medium and a non-printable area corresponding to an area not to be printed and in which at least one image that is a printing target is to be arranged, display a setting area, other than the display area, for accepting an operation for automatically changing, within the display area, a position of the at least one image arranged in the display area, and, upon accepting the operation on the setting area, automatically changing a position of a predetermined image arranged in an uppermost portion of the display area and a position of at least part of a crop mark, the part being set above the predetermined image, such that the predetermined image and the part fall within the printable area.

19 Claims, 4 Drawing Sheets

IMAGE PROCESSING APPARATUS, CONTROL METHOD, AND COMPUTER PRODUCT FOR ARRANGING AN IMAGE AND SETTING A CROP MARK DISPLAYED IN A PRINTABLE AREA

BACKGROUND

Field of the Disclosure

The present disclosure relates to a control method for an image processing apparatus, an image processing apparatus, and a non-transitory computer readable storage medium.

Description of the Related Art

In recent years, an application program by which a page and an image are displayed and arrangement of the image displayed on the page is changeable has been known. Furthermore, the emergence of a large-scale printer using a roll of paper has increased opportunities of creating work by printing an image on a large sheet and then cutting the sheet, for example. Accordingly, in some cases, a crop mark (printer's mark) as a mark of a trimming position is set for an image displayed by the above-described application program. Japanese Patent Laid-Open No. 2012-58303 discloses a method of enlarging a printable area so that a crop mark can be printed in a case where the crop mark overlaps an erasing area at an end of a sheet to be not printed.

There is a technique in which an application program automatically sets arrangement of an image to be displayed by the application program. However, Japanese Patent Laid-Open No. 2012-58303 does not take into account how to arrange an image for which a crop mark is set in a case where arrangement of an image displayed by the application program is automatically set by the application program.

SUMMARY

Accordingly, the present disclosure appropriately arranges an image for which a crop mark is set in a case where arrangement of an image displayed by the application program is automatically set by the application program.

A control method for an image processing apparatus according to an aspect of the present disclosure is a control method including: a first display step of displaying a display area that includes a printable area and a non-printable area, the printable area corresponding to an area to be printed on a recording medium, the non-printable area corresponding to an area not to be printed, and in which at least one image that is a printing target is to be arranged; a second display step of displaying a setting area that is an area for accepting an operation for automatically changing, within the display area, a position of the at least one image arranged in the display area, and is an area other than the display area; and a changing step of automatically changing, upon accepting the operation on the setting area, a position of a predetermined image arranged in an uppermost portion of the display area and a position of at least part of a crop mark, the part being set above the predetermined image, such that the predetermined image and the at least part of the crop mark fall within the printable area.

Further features of the present disclosure will become apparent from the following description of exemplary embodiments with reference to the attached drawings.

DESCRIPTION OF THE EMBODIMENTS

Figure 1:
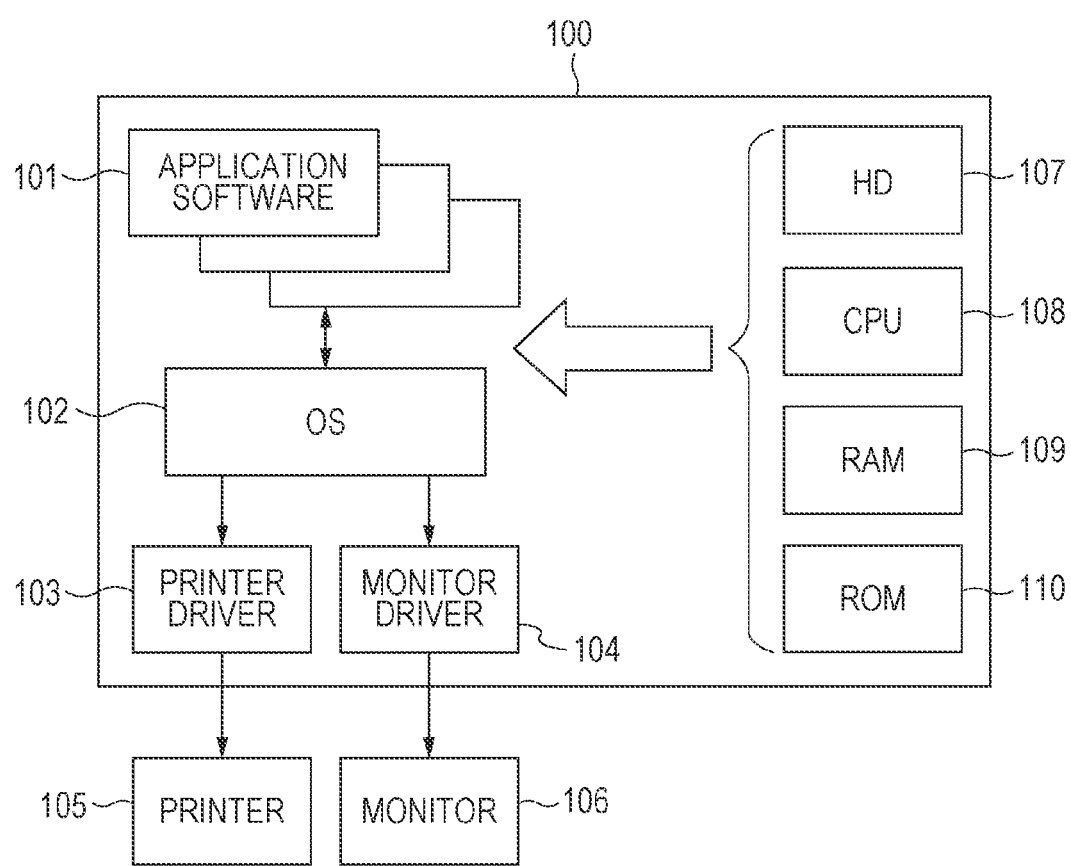
FIG. 1 illustrates a configuration example of a host computer as an image processing apparatus according to one or more aspects of the present disclosure.

Now, the present disclosure will be described below in detail with reference to the drawings. Note that the following embodiments do not limit the present disclosure according to the claims, and all combinations of features described in the embodiments are not always necessary for the present disclosure. In addition, the same or substantially the same structural elements are denoted by the same reference numerals in the attached drawings, and repeated description will be omitted.

First Embodiment

Apparatus Configuration

FIG. 1 illustrates a configuration example of a host computer 100 as an image processing apparatus according to this embodiment. The host computer 100 according to this embodiment is an image processing apparatus of any form capable of image processing and may be implemented by various kinds of apparatuses such as a personal computer (PC), a server, a smartphone, a tablet terminal, and the like.

The host computer 100 includes hardware components such as a central processing unit (CPU) 108, a hard disk (HD) 107, a random access memory (RAM) 109, a read-only memory (ROM) 110, and the like. These components are connected to one another via an internal bus (not illustrated). The CPU 108 reads out a program stored in the ROM 110 to the RAM 109 and executes the program so as to control operations of the host computer 100. The RAM 109 is used as a temporal storage area when the CPU 108 performs various kinds of processing. The ROM 110 or the HD 107 stores, for example, an operating system (OS) 102, application software 101, which will be described later, and the like. In addition, a printer 105 and a monitor 106, which are external apparatuses, are connected to the host computer 100, for example, via an external interface (I/F) (not illustrated). Note that the printer 105 and the monitor 106 may be connected to the host computer 100 directly via a cable or the like or via a wired or wireless local area network (LAN) or the like.

The host computer 100 further includes, as software components, an application program (hereinafter referred to as application) 101, the OS 102, a printer driver 103, and a monitor driver 104. For example, the host computer 100 includes one or more applications as the application 101, such as a word processor, a spreadsheet, an Internet browser, or a combination thereof.

Now, an application program (hereinafter referred to as application 101*a*) having a function of arranging (laying out) and editing an image on a page, which is one of the applications in the application 101, will be described. Specifically, the application 101a executes predetermined processing and issues a group of various draw processing commands (e.g., image draw command, text draw command, and graphics draw command) for generating an image that displays a result of the execution of the processing. The group of draw processing commands issued by the application 101a is then input to the monitor driver 104 via the OS 102. If the group of draw processing commands relates to printing, the group of draw processing commands is also input to the printer driver 103 via the OS 102. The printer driver 103 is software for processing the input group of draw processing commands to create printing data and to cause the printer 105 to print the data. The monitor driver 104 is software for processing the input group of draw processing commands to cause the monitor 106 to display an image.

By using text data classified as text such as characters, graphics data classified as graphics such as figures, image data classified as photographic images, or the like, the host computer 100 creates output image data with the application 101a. Images based on the output image data are displayed on the monitor 106. In a case where the images based on the output image data are to be printed, the application 101a requests the OS 102 for print out. In this case, a group of draw commands, in which a text data portion is composed of the text draw command, a graphics data portion is composed of the graphics draw command, and an image data portion is composed of the image draw command, is issued for the OS 102.

Screen Configuration Example

Figure 2:
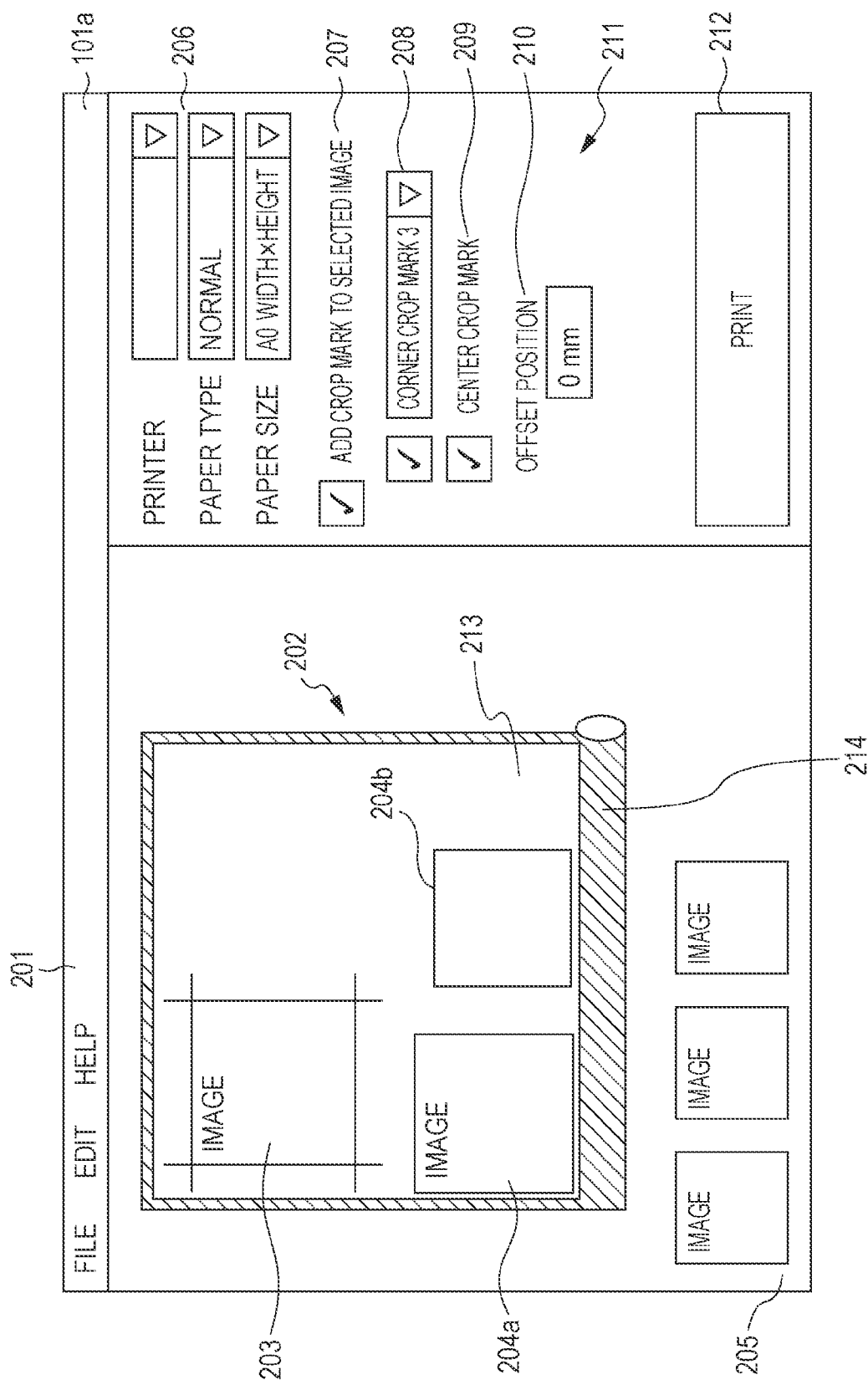
FIG. 2 illustrates a configuration example of a screen of an application having a function of arranging and editing an image on a page according to one or more aspects of the present disclosure.

FIG. 2 illustrates a configuration example of an editing screen displayed by the above-described application 101a. The application 101a herein is software for creating output image data in which, for example, a plurality of printing-target images are arranged. For example, with this software, the output image data is displayed on the editing screen, and the printing-target images arranged in the output image data are editable by a user operation. In this example, the editing screen includes a menu operating portion 201, a page display area 202, a thumbnail image display area 205, a print setting portion 206, a crop mark setting portion 211, and a print button 212.

The menu operating portion 201 is an area for accepting a user's selection for functions of ending the application 101a, designating addition of an image on a page, editing an image, and the like. By the user selecting a command displayed in the menu operating portion 201, a corresponding function is executed by the application 101a. For example, the user can select an image displayed in the thumbnail image display area 205 from a file menu in the menu operating portion 201. Then, the user can drag the image displayed in the thumbnail image display area 205 and drops it in the page display area 202, thereby displaying the image in the page display area 202. Note that the image selected by the user from the file menu in the menu operating portion 201 may also be displayed in the page display area 202 instead of the thumbnail image display area 205. In this case, as a method of displaying the image in the page display area 202, which will be described later, the following disclosure may be reflected.

Note that the file menu in the menu operating portion 201 includes a menu for displaying a setting screen. Although the menu for displaying the setting screen is included in the menu operating portion 201 in this embodiment, the setting screen may be displayed in any area on the screen of the application 101a.

The page display area 202 displays pages, images, or image slots created in the page display area 202. That is, the user can arrange, within the page display area 202, any image that the user wishes to print. In addition, the page display area 202 accepts an operation of editing image data arranged on a page. These images are selectable with a pointing device, for example, and settings of a selected image can be performed on the page. For example, settings such as movement, enlargement, or reduction of the selected image can be performed in the page display area 202. In the page display area 202, a printable area 213 and a non-printable area 214 are displayed. The printable area 213 represents an area to be actually printed on the page, and the non-printable area 214 represents an area not to be actually printed on the page. The printable area 213 corresponds to an area in which recording (printing) is performed on a recording medium, and a display size of the printable area 213 is set on the basis of the size of a single sheet that is set as a sheet for printing targets. The non-printable area 214 corresponds to an area in which recording is not performed on the recording medium. Although images can be arranged in the non-printable area 214 on the editing screen, even if a print instruction is issued in this state, the area overlapping the non-printable area 214 is not printed. The non-printable area 214 is, for example, a margin area that is secured in order to prevent the interior of the apparatus from getting dirty when an image to be formed is misaligned with a recording medium or when the amount of toner is large. In this embodiment, the page display area 202 displays a page in a state where a roll of paper is set as a sheet for printing targets. However, the page display area 202 may also display a page in a state where cut paper including a blank form (standard sized paper) in the size of A3, A4, etc. is set as a sheet for printing targets. In a case where there are a plurality of pages, the page display area 202 may transit from page to page.

The thumbnail image display area 205 displays thumbnail images representing the images displayed in the page display area 202 and thumbnail images representing candidate images that can be arranged in the page display area 202. Furthermore, in addition to the thumbnail images, the thumbnail image display area 205 also displays, together with the thumbnail images, an icon indicating the number of images corresponding to the respective thumbnail images displayed in the page display area 202. Note that the thumbnail image display area 205 may also display an image stored in the HD 107 and may display a thumbnail image of an image stored in a folder upon the folder being designated by a user operation.

The print setting portion 206 accepts a user operation for various settings regarding printing, such as a printer, a paper type, and a paper size. Now, printer settings will be described. For example, the printer settings may be selected from a drop-down list. First, a user can register a printer that can be connected to the application 101a in "add printer" in a drop-down list menu for the printer settings in the application 101a. Specifically, upon selection of "add printer", a setting screen for adding a printer is displayed. On the displayed setting screen, among printers connected to a network to which the host computer 100 is connected, a printer compatible with the application 101a is displayed. Then, the user can register the displayed printer for the application 101a. The name of the registered printer is displayed in the drop-down list menu on the printer setting screen, and the user can select a printer for printing a printing target. Note that the method of indicating a printer displayed in the drop-down list menu may also be another method instead of displaying the name. The selected printer is wirelessly connected to the host computer 100 and performs printing upon the print button 212, which will be described later, being pressed. Examples of a communication scheme used for connecting apparatuses include a communication standard (Wi-Fi) in the IEEE 802.11 series and Bluetooth (e.g., Bluetooth Classic or Bluetooth Low Energy (BLE)). Note that the apparatuses are not necessarily wirelessly connected to each other. Specifically, for example, the apparatuses may be connected to an access point such as a wireless LAN router or a base station by Wi-Fi or mobile communication (3G, 4G, or 5G), and communication therebetween may be performed by Internet communication via the access point. The connection may be wired.

Upon the print setting portion 206 accepting a user operation, the page display area 202 displays a result or the like changed by the accepted settings of the printer, the paper type, the paper size or the like.

The crop mark setting portion 211 accepts settings of a crop mark to be set for an image selected in the page display area 202. Note that the crop mark setting portion 211 may accept, not only settings of the crop mark to be set for the image selected in the page display area 202, but also, for example, settings of a plurality of crop marks to be set for all images displayed in the page display area 202. An addition selection section 207 accepts a user operation for deciding whether a crop mark is to be set for the image selected in the page display area 202. For example, the addition selection section 207 is a checkbox. For example, if the checkbox is checked, it is determined that a crop mark is set for the image selected in the page display area 202. Then, a type selection section 208, a center crop mark selection section 209, and an offset position setting portion 210 become capable of accepting a user operation. The type selection section 208 accepts selection of the type of crop mark to be set for the image selected on the editing screen. The center crop mark selection section 209 accepts a user operation for deciding whether a center crop mark is to be set for the image selected in the page display area 202. The offset position setting portion 210 accepts settings of an offset position of the crop mark set for the image selected in the page display area 202. Thus, upon the addition selection section 207 accepting an operation for setting a crop mark in a state where any of images in the page display area 202 is selected, the page display area 202 displays a crop-mark-added image 203 in which a crop mark is set for the selected image. Although the crop mark is set for the image, the crop mark may also be set for an image slot. In a case where an image assignment method, which will be described later, is a first assignment method, a margin (edge) is created between two sides, which are either the top and bottom two sides or the left and right two sides, of the image slot and two sides, which are either the top and bottom two sides or the left and right two sides, of the image. In this case, a crop mark is not set at each intersection point (corner) of the sides of the image slot but is set at each intersection point of the sides of the image inserted into the image slot. However, a crop mark may also be set at each intersection point of the sides of the image slot. Note that in a case of a second assignment method, or in a case where the image and the image slot have the same aspect ratio, a crop mark set for the image and a crop mark set for the image slot are displayed to be set at the same position.

The image slot herein is a frame (box) into which an image is inserted. For example, an image displayed in the page display area 202 by a user operation is displayed in a state 204a being inserted into an image slot in the page display area 202. In addition, an image slot 204b in a state where no image is inserted can also be created in the page display area 202. Since the image slot is present, if an image displayed in the page display area 202 is wished to be changed to another image, without changing the size or arrangement to be displayed, only the image can be changed. In addition, in a case where a print product constituted of different images in the same arrangement throughout a plurality of pages is wished to be created, a page on which only an image slot is arranged in advance is copied. Then, by inserting images that are different from page to page into the image slots on the respective pages, the user can shorten the operation time. Herein, as described above, the image is displayed in the page display area 202 in a state of being inserted into the image slot. That is, a setting size of the image displayed in the page display area 202 is set on the basis of a setting size of the image slot, and the image is displayed in a state of being inserted into the image slot. As a result, a display size of the image is set on the basis of a display size of the image slot. Note that definitions of the setting size and the display size will be described later. Herein, a case can be considered where an aspect ratio of the setting size of the image slot mismatches an aspect ratio of the setting size of the image to be inserted into the image slot. A method (hereinafter referred to as image assignment method) of inserting the image into the image slot corresponding to this case will be described. There are two methods as image assignment methods. The first assignment method is a method in which the setting size of the image is enlarged/reduced in accordance with the setting size of the image slot such that the four (all) sides of the image fall within the image slot, and the image is inserted. Specifically, the setting size of the image is enlarged/reduced until the four sides of the image fall within the image slot and either the top and bottom two sides or the left and right two sides of the image is in contact with either the top and bottom two sides or the left and right two sides of the image slot, and the image is arranged at the center of the image slot with the enlarged/reduced setting size. When the image is inserted into the image slot and displayed by this method, a margin (edge) is created between two sides, which are either the top and bottom two sides or the left and right two sides, of the image slot and two sides, which are either the top and bottom two sides or the left and right two sides, of the image. That is, the entire image is displayed within the image slot. The second assignment method is a method in which the setting size of the image is enlarged/reduced in accordance with the setting size of the image slot such that either the top and bottom two sides or the left and right two sides of the image fall within the image slot, and the image is inserted. Specifically, the setting size of the image is enlarged/reduced until either the top and bottom two sides or the left and right two sides of the image fall within the image slot and the two sides of the image within the image slot are in contact with either the top and bottom two sides or the left and right two sides of the image slot, and the image is arranged at the center of the image slot with the enlarged/reduced setting size. When the image is inserted into the image slot and displayed by this method, no margin (edge) is created between two sides, which are either the top and bottom two sides or the left and right two sides, of the image slot and two sides, which are either the top and bottom two sides or the left and right two sides, of the image, and the image is displayed in the entire image slot. That is, part of the image, including two sides not within the image slot, is out of the image slot. The part out of the image slot is not displayed in the page display area 202 and is not printed either.

Note that the user can set either the first assignment method or the second assignment method to be applied as the assignment method when the image is inserted into the image slot. This setting will be described later. In a case where the aspect ratio of the setting size of the image slot matches the aspect ratio of the setting size of the image to be inserted into the image slot, the setting size of the image is enlarged/reduced in accordance with the setting size of the image slot so that the four (all) sides of the image can be in contact with the four (all) sides of the image slot, and the image is inserted.

The print button 212 accepts a print execution instruction by a user operation. Upon the print button 212 being pressed, the application 101a issues a group of various draw processing commands on the basis of the output image data in a state of being displayed in the page display area 202 and the set paper type and paper size. Upon the group of various draw processing commands being input to the printer driver 103 via the OS 102, the printer driver 103 processes the input group of draw processing commands and creates print data. Then, the printer driver 103 transmits the print data to a printer (herein, the printer 105) selected in the print setting portion 206. The printer 105 receives the print data and executes printing on the basis of the received print data. Note that in a case where the application 101a has a function of a printer driver, after issuing the group of various draw processing commands, the application 101a processes the group of various draw processing commands and creates print data. Then, the application 101a transmits the print data to a printer (herein, the printer 105) selected in the print setting portion 206. Now, a method of displaying an image in the page display area 202 will be described. In this embodiment, there are two image display methods compatible with the application 101a. A first method is an image display method using a drag-and-drop operation (hereinafter referred to as first image display method).

Specifically, the first image display method is a method in which an image in the thumbnail image display area 205, on a desktop of the host computer 100, or in a folder or the like is dragged and dropped in the page display area 202 so as to display the image in the page display area 202. Note that the first image display method may also be an image display method using a copy-and-paste operation. Specifically, the first image display method may be a method in which an image in the thumbnail image display area 205, on a desktop of the host computer 100, or in a folder or the like is copied and pasted in the page display area 202 so as to display the image in the page display area 202.

A second method is an image display method using cooperative starting (hereinafter referred to as second image display method).

First, the cooperative starting will be described. As described above, the application 101 is constituted of one or more applications and includes the above-described application 101a and an image editing application (hereinafter referred to as application 101b) such as Adobe Photoshop (registered trademark). The application 101a can acquire an image from the application 101b. For example, a screen displayed by the application 101b includes a print button, and upon the print button being pressed by a user, the application 101a is started. In the above manner, the starting of the application 101a by a starting method in which an application is started in response to an operation on a screen displayed by another application will be hereinafter referred to as cooperative starting. In the cooperative starting, while the application 101b copies image data generated in the application 101b and shares (transfers) the copied image data to the application 101a, the application 101a can be started. A method of sharing the image data will be described. For example, the application 101b stores image data in a folder that is designated as a plug-in of the application 101a and accessible by the application 101a and the application 101b. Then, the application 101a acquires the image data stored in the designated folder. Thus, the image data is shared from the application 101b to the application 101a. Note that the storage of the image data may be a space in memory or another space instead of the folder. In addition, the image itself or large amounts of data may be stored in the folder and data related to the image may be stored in a space in memory. Furthermore, the storage of the image data may be determined depending on the type of application program. Note that the sharing method may be another method.

That is, the second image display method is a method of displaying, in the page display area 202, an image based on image data that is shared from the application 101b to the application 101a at the time of cooperative starting. Note that the cooperative starting is executed in a state where the application 101a is ended in this embodiment. A case where an operation for cooperative starting is performed in the application 101b in a state where the application 101a is not ended will be described. In this case, the activated application 101a is displayed on the foreground, and the application 101a at this time may acquire image data from the application 101b. Note that the application 101a may display an image by either one of the methods instead of including both methods of displaying an image in the page display area 202.

Now, sizes related to an image defined in this embodiment will be described. In this embodiment, as sizes related to an image, an image slot, and a page, there are a setting size, a display size, and a printing size. The setting size is a size set as a value for each image, each image slot, or a page. Note that the setting size of a page corresponds to a paper size for printing targets. The display size is a size displayed on a screen by the application 101a. More specifically, the display size is a size representing a relative size of the setting size managed by the application 101a, relative to the setting size of a page displayed in the page display area 202. For example, a case where the paper size of the page displayed in the page display area 202 is 1000 mm×1000 mm and the setting size of an image managed by the application 101a is 300 mm×300 mm will be described. In this case, the display size of the image is 3/10 relative to the display size of the page. The printing size is the size of an image on a sheet when the image is printed, and printing is performed such that the printing size of the image equals to the setting size of the image.

The application 101a is operable in an automatic arrangement mode. The automatic arrangement mode is a mode in which the application 101a automatically changes and sets arrangement of images displayed by the application 101a without accepting a user operation of designating destinations of the images. In a state where the application 101a is in operation in the automatic arrangement mode, when a first image is displayed in the page display area 202, the first image is automatically arranged by the application 101a in an upper left portion of a page in the page display area 202. Then, when a second image is displayed in the page display area 202, the second image is automatically arranged by the application 101a on the right of the first image with a predetermined interval therebetween. This is repeated, and if an image overlaps the non-printable area 214, a new line is started, and the image is automatically arranged by the application 101a in an upper left portion of the page in an area not overlapping images that are already present. Subsequently, an operation of arranging an image on the right with a predetermined interval therebetween is automatically repeated by the application 101a. Note that images may be automatically arranged by another algorithm in the automatic arrangement mode.

As described above, the page display area 202 includes the printable area 213 and the non-printable area 214. In a case where a print instruction is issued in a state where crop marks set for an image and an image slot overlap the non-printable area 214, the crop marks overlapping the non-printable area 214 are not to be printed. At this time, if crop marks set for an image and an image slot are not arranged so as to fall within the printable area 213 but are arranged so as to protrude to the non-printable area 214 by the automatic arrangement mode, crop marks are not to be printed. As a result, the convenience of a user who wishes to use the crop marks on a print product is reduced. In addition, for example, if a user manually changes the position of the crop marks such that the crop marks do not overlap the non-printable area 214 so as to print the crop marks, the user is bothered. Therefore, the following description will illustrate a case where both crop marks set for an image and an image slot are controlled to be arranged so as to fall within the printable area 213 in a case where the automatic arrangement mode is set, thereby increasing the user's convenience.

Processing Example

Figure 3:
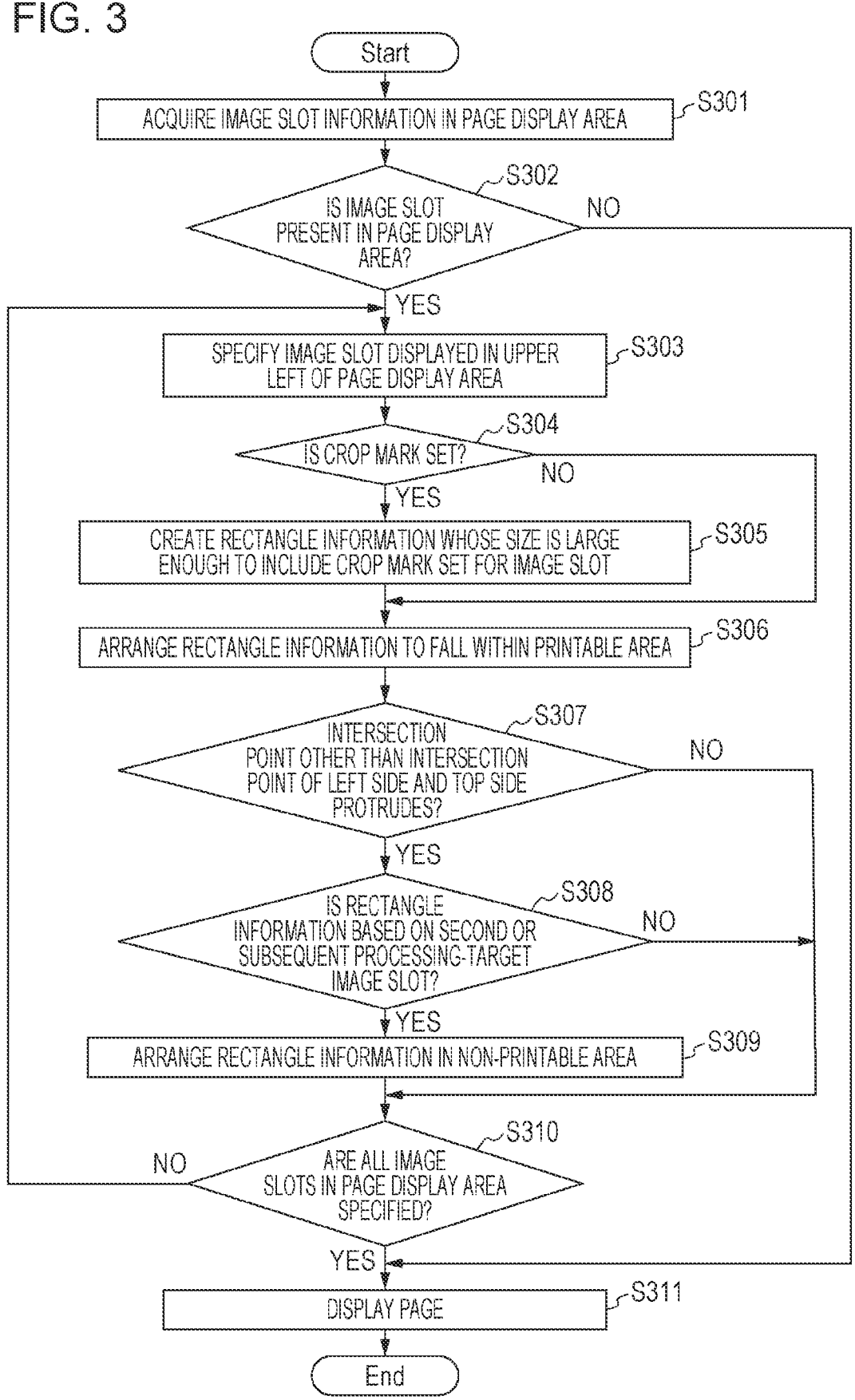
FIG. 3 is a flowchart illustrating a processing example of an application according to one or more aspects of the present disclosure.

FIG. 3 is a flowchart illustrating a processing example of the application 101 in a case where a crop mark is set for an image or an image slot arranged in the page display area 202 in FIG. 2. For example, the flowchart is implemented by the CPU 108 reading out the application 101 stored in the ROM 110 to the RAM 109 and executing it. For example, the CPU 108 starts this processing in response to a user selecting the automatic arrangement mode set in the print setting portion 206 (user performing an operation for designating automatic arrangement by the automatic arrangement mode).

In S301, the CPU 108 acquires image slot information in the page display area 202. The information acquired in this step is information indicating whether at least one image slot is present in the page display area 202. Furthermore, if at least one image slot is present, the information includes information indicating whether a crop mark is set for at least one image. Note that the at least one image may or may not be inserted into the at least one image slot. If at least one image is inserted into at least one image slot and no crop mark is set for the at least one image, the information includes information indicating whether a crop mark is set for the at least one image slot.

In S302, the CPU 108 determines whether at least one image slot is present in the page display area 202. If the determination is YES, the CPU 108 advances to S303; if the determination is NO, the CPU 108 advances to S311.

In S303, the CPU 108 specifies an uppermost and leftmost image slot in the page display area 202 among image slots that are determined to be present in the page display area 202 in S302 and that are yet to be specified in S303. The uppermost and leftmost image slot in the page display area 202 is specifically an image slot whose left side is located at the leftmost position in the page display area 202 compared with the other image slots among image slots whose top sides are located at the uppermost position in the page display area 202 compared with the other image slots. However, the uppermost and leftmost image slot in the page display area 202 may also be an image slot whose top side is located at the uppermost position in the page display area 202 compared with the other image slots among image slots whose left sides are located at the leftmost position in the page display area 202 compared with the other image slots. Note that the page display area 202 includes the printable area 213 and the non-printable area 214. In addition, images may or may not be inserted into the image slots. Although the uppermost and leftmost image slot in the page display area 202 is specified in S303 in this embodiment, any other image slot, such as the uppermost and rightmost image slot in the page display area 202, may also be specified.

In S304, the CPU 108 determines whether a crop mark is set for an image in the specified image slot. If the determination is YES, the CPU 108 advances to S305; if the determination is NO, the CPU 108 advances to S306.

In S305, the CPU 108 creates rectangle information whose size is large enough to include the image in the specified image slot and the crop mark set for the image. Note that the crop mark may be set for the image or may be set for the image slot. If the crop mark is set for the image slot, rectangle information whose size is large enough to include the specified image slot and the crop mark set for the image slot is created. Although the rectangle information is not displayed in the page display area 202, a rectangle based on the created rectangle information may also be displayed.

In S306, the CPU 108 automatically arranges the rectangle information in the page display area 202 in accordance with the automatic arrangement mode such that the rectangle information created in S305 falls within the printable area 213. Specifically, the CPU 108 automatically arranges the rectangle information in the page display area 202 in accordance with the automatic arrangement mode such that at least an intersection point of the left side and the top side of the created rectangle information falls within the printable area 213. For example, the CPU 108 arranges the rectangle information in an upper left portion of a page in the page display area 202. In this manner, by creating the rectangle information whose size is large enough to include the crop mark set for the image slot, and by automatically arranging the rectangle information in the page display area 202 in accordance with the automatic arrangement mode to fall within the printable area 213, the crop mark is controlled so as not to protrude to the non-printable area 214.

Note that the file menu in the menu operating portion 201 has setting items (hereinafter referred to as image slot interval settings during the automatic arrangement mode) with which a predetermined interval, which is an interval to be referred to during the automatic arrangement mode and is an interval between image slots arranged by the automatic arrangement mode, is settable. With these setting items, a user can input any given value to be set as the predetermined interval.

Although the predetermined interval in this embodiment is an interval between an image and an image arranged by the automatic arrangement mode, the predetermined interval is not limited to this. For example, the predetermined interval may also be an interval between a piece of rectangle information and a piece of rectangle information arranged by the automatic arrangement mode. In addition, for example, the predetermined interval may also be an interval between an image slot and an image slot arranged by the automatic arrangement mode. Note that a single piece of rectangle information in this embodiment is set so as to include an image slot, an image inserted into the image slot, and a crop mark added to the image. Thus, an interval between a piece of rectangle information and a piece of rectangle information is controlled to be the predetermined interval, and as a result, the crop mark is controlled so as not to overlap another crop mark, another image, or another image slot.

The value of the predetermined interval may be a value designated by a user input in the above manner, or may be a value set in the application 101*a* in advance so as to be applied during the automatic arrangement mode.

Note that the menu for displaying the image slot interval settings is included in the menu operating portion 201 in this embodiment. The menu may be displayed in any area on the screen of the application 101*a*.

Now, a case where a crop mark is set for each of adjacent pieces of rectangle information will be described. The adjacent pieces of rectangle information are automatically arranged so as to fall within the printable area 213 in the page display area 202 in accordance with the automatic arrangement mode. In a crop mark in the rectangle information, an intersection point of a straight line in the length (vertical) direction of a sheet and a straight line in the width (horizontal) direction of the sheet will be hereinafter referred to as intersection point of a crop mark. For example, the adjacent pieces of rectangle information may be arranged such that an intersection point of a crop mark set for each of an intersection point of the left side and the top side and an intersection point of the right side and the top side of a piece of rectangle information has the same coordinate value in the length (vertical) direction of the sheet as an intersection point of a crop mark set for each of an intersection point of the left side and the top side and an intersection point of the right side and the top side of the adjacent piece of rectangle information. Thus, when a user cuts the sheet in the width (horizontal) direction of the sheet, the intersection points of crop marks of a plurality of images are arranged on the same straight line in the cutting direction, thereby increasing usability during the cutting. Note that, as described above, if the intersection points of crop marks set for the adjacent pieces of rectangle information have the same coordinate value in the length (vertical) direction of the sheet, straight lines of adjacent crop marks in the pieces of rectangle information in the width (horizontal) direction of the sheet may be arranged so as to overlap each other. Also in this case, the straight lines of the crop marks in the width (horizontal) direction of the sheet are arranged so as not to overlap the images in the adjacent pieces of rectangle information. In this case, if the images include edges, the edges are regarded as part of the images, and the straight lines of the crop marks in the width (horizontal) direction of the sheet are arranged so as not to overlap the edges of the images either. Note that the edge is an area generated by the first assignment method, in which an image within an image slot is not arranged and which is located above and below or left and right of the image arranged in the image slot. Alternatively, the edge may include an area with a width that is set around the image so as to surround the image. This can reduce the margin of the sheet of paper.

In addition, in a case where no crop mark is set for a specified image slot, the rectangle information whose size is large enough to include the crop mark set for the image slot is not created, and the image slot itself serves as the rectangle information.

That is, the size of the rectangle information is equal to the size of the image slot itself. Furthermore, the rectangle information is automatically arranged so as to fall within the printable area 213 in the page display area 202 in accordance with the automatic arrangement mode.

In S307, the CPU 108 determines whether an intersection point other than the intersection point of the left side and the top side of the created rectangle information protrudes to the non-printable area 214. If the determination is YES, the CPU 108 advances to S308; if the determination is NO, the CPU 108 advances to S310. Herein, the intersection point other than the intersection point of the left side and the top side of the created rectangle information is at least one of an intersection point of the left side and the bottom side, the intersection point of the right side and the top side, and an intersection point of the right side and the bottom side of the created rectangle information. Now, a case where the intersection point of the right side and the top side and the intersection point of the right side and the bottom side of the created rectangle information protrude to the non-printable area 214 will be described. For example, this case corresponds to a case where the length of the top side and the bottom side of the created rectangle information is longer than the width of a page provided by the automatic arrangement mode and does not completely fall within the printable area 213. In addition, a case where the intersection point of the left side and the bottom side and the intersection point of the right side and the bottom side of the created rectangle information protrude to the non-printable area 214 will be described. For example, this case corresponds to a case where the length of the right side and the left side of the created rectangle information is longer than the length of a page provided by the automatic arrangement mode and does not completely fall within the printable area 213 or a case where a plurality of pieces of rectangle information do not completely fall within the length of a page provided by the automatic arrangement mode.

In S308, the CPU 108 determines whether the created rectangle information is created on the basis of an image slot that is specified for the second or subsequent time in S303. If the determination is YES, the CPU 108 advances to S309; if the determination is NO, the CPU 108 advances to S310. Here, a case where the determination in S303 is NO, that is, a case where the rectangle information is not created on the basis of an image slot that is specified for the second or subsequent time will be described. This corresponds to rectangle information that is created on the basis of an image slot that is specified for the first time in S303 and is the uppermost and leftmost image slot among the image slots that are determined to be present in the page display area 202 in S301. That is, in a case where part of the rectangle information created on the basis of the image slot that is specified for the first time in S303 already protrudes to the non-printable area 214, the rectangle information is arranged with the part protruding. This is because a user can be notified that the part of the rectangle information protrudes to the non-printable area 214 as long as the rectangle information is created on the basis of the image slot that is specified for the first time.

In S309, if the created rectangle information is created on the basis of an image slot that is specified for the second or subsequent time in S303, the CPU 108 arranges the created rectangle information in the non-printable area 214. For example, the CPU 108 arranges the rectangle information at any position in a lower right portion of the sheet in the non-printable area 214. This is for notifying a user that the rectangle information created on the basis of an image slot that is specified for the second or subsequent time protrudes to the non-printable area 214. Even if the rectangle information is created on the basis of the image slot that is specified for the first time in S303, the CPU 108 may arrange the rectangle information in the non-printable area 214 in S308 (that is, the determination in S308 may be skipped).

In S310, the CPU 108 determines whether all the image slots in the page display area 202 are specified. If the determination is YES, the CPU 108 advances to S311; if the determination is NO, the CPU 108 returns to S302.

In S311, the CPU 108 displays an automatically arranged state of a page. That is, if all the image slots in the page display area 202 are specified in S310, the page display area 202 including rectangle information arranged in the printable area 213 is displayed. If there are no image slots in the page display area 202 in S301, the page is displayed as it is.

As described above, according to this embodiment, if the automatic arrangement mode is applied in a case where a crop mark is set for a selected image slot or image, the image slot including the crop mark is automatically arranged in the printable area 213 in the page display area 202. Thus, the crop mark set for the image slot or image does not protrude to the non-printable area 214, and the image that is a printing target including the crop mark is printed on the sheet. In addition, the crop mark is automatically arranged so as not to overlap another crop mark or image. Therefore, a user does not have to perform an operation of moving the crop mark or image to a position within the printable area while checking a print preview, and thereby, the user's operation load can be reduced.

Note that a case is described above where the image that is automatically arranged by the automatic arrangement mode is an image displayed in the page display area 202 when a user performs an operation for designating automatic arrangement by the automatic arrangement mode. However, the present disclosure is not limited to this case. For example, after a user performs an operation for designating automatic arrangement by the automatic arrangement mode, an image that is dragged from the thumbnail image display area 205, a desktop, a folder, or the like and is dropped in the page display area 202 may also be automatically arranged.

Second Embodiment

The first embodiment has described processing in a case where an image slot including a crop mark is automatically arranged in the printable area 213 in the page display area 202.

This embodiment will describe processing in a case where an image slot including a crop mark is automatically arranged in the printable area 213 in the page display area 202 also in a case of an automatic arrangement mode having a function of classifying and rearranging image slots depending on an attribute. Now, the attribute in the classification of the image slots will be described. The attribute is whether an image is inserted into an image slot, the size of the image slot, the presence or absence of a crop mark, the assignment method of the image inserted into the image slot, the position of the crop mark set for the image slot, or the like. Note that in a case where no image is inserted into an image slot, the image slot is specified later at the time of rearrangement. In addition, the position of the crop mark set for the image slot is the position where the crop mark is to be added on the assumption that the crop mark is set even if no crop mark is set. Furthermore, in a case where the crop mark is set for an image, the image slot is specified later at the time of rearrangement. Since the image slots are displayed by being classified and rearranged depending on such an attribute during the automatic arrangement mode, a user can easily grasp settings of the image slots. Note that different points from the first embodiment will mainly be described below.

Processing Example

Figure 4:
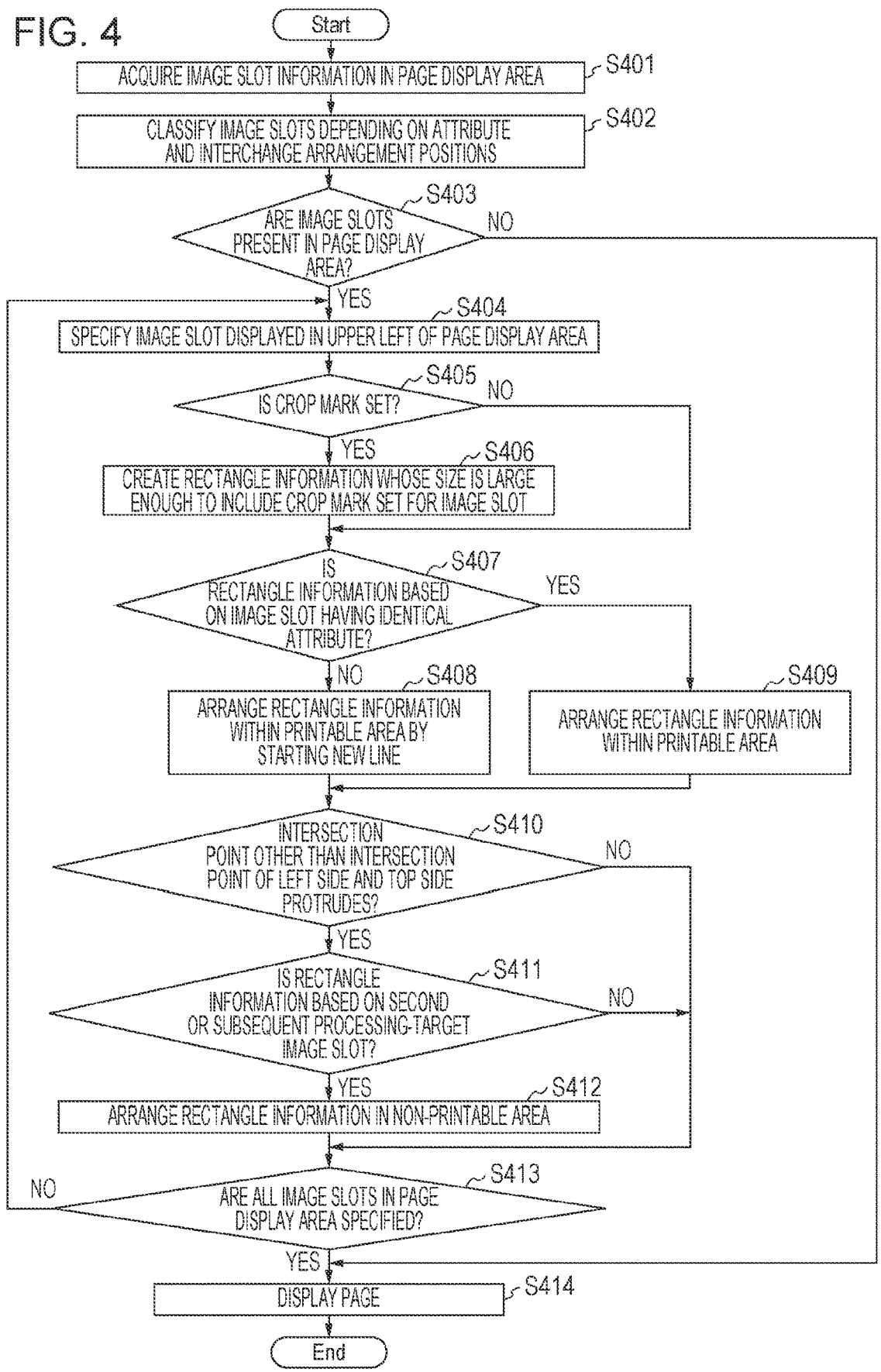
FIG. 4 is a flowchart illustrating a processing example of an application according to one or more aspects of the present disclosure.

FIG. 4 is a flowchart illustrating a processing example of the application 101 in a case where a crop mark is set for an image arranged in the page display area 202 in FIG. 2. For example, the flowchart is implemented by the CPU 108 reading out the application 101 stored in the ROM 110 to the RAM 109 and executing it. For example, the CPU 108 starts this processing in response to selection of the automatic arrangement mode set in the print setting portion 206.

S401 is substantially the same as S301, and thus, description thereof is omitted.

In S402, the CPU 108 classifies the image slots in the page display area 202 depending on an attribute. Specifically, for example, the CPU 108 classifies the image slots in the page display area 202 depending on an attribute such as whether an image is inserted into an image slot, the size of the image slot, the presence or absence of a crop mark, the assignment method of the image inserted into the image slot, or the position of the crop mark set for the image slot. First, for example, the CPU 108 classifies the image slots in the page display area 202 depending on whether an image is inserted into an image slot. That is, the image slots are classified into image slots in which images are inserted and image slots in which no images are inserted. After an image slot has been classified as an image slot in which no image is inserted, if an image is inserted and the automatic arrangement mode is selected again, the image slot is classified as an image slot in which an image is inserted.

Subsequently, for example, the CPU 108 classifies the setting size of the image slots into ten levels. The image slots in the page display area 202 are classified into any level of the setting size in ten levels. For example, an image slot having a setting size within a predetermined value range that is set as a certain level is classified into the certain level. Thus, into each level, image slots having a similar setting size in the page display area 202 are classified. The CPU 108 classifies the image slots that are classified into image slots in which images are inserted and the image slots that are classified into image slots in which no images are inserted.

Subsequently, the CPU 108 classifies the image slots depending on the presence or absence of a crop mark set for an image or an image slot. For example, the CPU 108 classifies the image slots depending on whether a crop mark is set for an image slot that is classified into a certain level in the classification depending on the setting size of the image slot or whether a crop mark is set for an image inserted into the image slot. After an image slot has been classified as an image slot in which a crop mark is set for an image or the image slot, if a crop mark is set and the automatic arrangement mode is selected again, the image slot is classified as an image slot in which a crop mark is set for an image or the image slot.

Subsequently, the CPU 108 classifies the image slots depending on the assignment method of the image inserted into the image slot. For example, image slots that are classified into a certain level and then classified depending on the presence or absence of a crop mark set for an image or an image slot are further classified depending on the assignment method of the image inserted into the image slot. For example, the image slots are further classified depending on whether the image is inserted into the image slot by the first assignment method, whether the image is inserted into the image slot by the second assignment method, or the like.

Subsequently, the CPU 108 further classifies the image slots depending on the position of the crop mark set for the image or the image slot. For example, image slots in a certain level classified depending on the assignment method are further classified depending on the position of the crop mark. For example, the image slots are classified depending on whether the crop mark is set for either the image or the image slot, whether the crop mark is set at a position from a corner of the image or the image slot with a predetermined distance therebetween (whether an offset position is set for the crop mark), or the like. For an image or an image slot for which no crop mark is set, upon a crop mark being set, the image slot is further classified depending on the position of the set crop mark.

In addition, the CPU 108 classifies the image slots depending on the presence or absence of a crop mark, the assignment method, and the position of the crop mark in all levels in the classification depending on the setting size of the image slots. For example, in a case where the levels of the setting size of the image slots are ten levels, all the image slots in the page display area 202 classified into the respective levels are further classified depending on the presence or absence of a crop mark, the assignment method, and the position of the crop mark. Although the classification depending on the assignment method is followed by the classification depending on the position of the crop mark in this embodiment, the order may be interchanged.

Furthermore, as a result of the classification depending on all the attributes, the CPU 108 rearranges the image slots in the page display area 202 such that image slots having an identical attribute are arranged in order from the upper left of the page display area 202. Specifically, for example, the CPU 108 specifies an uppermost and leftmost image slot among the image slots in the page display area 202 on the basis of the image slot information in the page display area 202 acquired in S401. Subsequently, among the image slots except for the specified uppermost and leftmost image slot, the CPU 108 specifies an image slot (first image slot) that has the identical attribute with the specified uppermost and leftmost image slot and that is an uppermost and leftmost image slot. Furthermore, among the image slots except for the specified uppermost and leftmost image slot, the CPU 108 specifies an image slot (second image slot) that does not have the identical attribute with the specified uppermost and leftmost image slot and that is an uppermost and leftmost image slot. In a case where the specified second image slot is in the upper left of the specified first image slot in the page display area 202, the CPU 108 interchanges arrangement positions of the first image slot and the second image slot. If there are image slots that are yet to be specified as a first image slot, the CPU 108 specifies the first image slot among them. The CPU 108 also specifies a second image slot. Similarly, in a case where the specified second image slot is in the upper left of the specified first image slot in the page display area 202, the CPU 108 interchanges arrangement positions of the first image slot and the second image slot. Therefore, while the first image slot is not specified again after it has been specified once and the arrangement position has been changed, the second image slot may be specified again and again and the arrangement position may be changed. By repeatedly interchanging the arrangement positions, the CPU 108 can arrange, among the image slots in the page display area 202, image slots having the identical attribute with the uppermost and leftmost image slot in order from the upper left of the page display area 202.

Subsequently, among image slots that does not have the identical attribute with the specified uppermost and leftmost image slot, the CPU 108 specifies an uppermost and leftmost image slot. As in a case for the uppermost and leftmost image slot in the page display area 202, the CPU 108 rearranges the image slots in the page display area 202. Note that, in the classification depending on whether images are inserted into image slots, attributes of an image slot into which no image is inserted are specified later than attributes of an image slot into which an image is inserted. This is for preventing the image slots into which no images are inserted from being printed to create a margin. In addition, among the image slots into which no images are inserted, in the classification depending on the position of the crop mark set for the image slot, the attribute that a crop mark is set for an image is specified later than the attribute that a crop mark is set for an image slot. This is because the attribute that a crop mark is set for an image slot has priority since, upon an image being inserted into an image slot in which no image has been inserted, a crop mark is set for the image.

The CPU 108 can rearrange all the image slots in the page display area 202 such that image slots having the identical attribute are arranged in order from the upper left of the page display area 202 in the above manner or any other manner.

Note that an image slot displayed in the upper left of the page display area 202 is specified in S404 described later. However, in a case where the image slots are not specified starting from the upper left image slot in the page display area 202, the arrangement position is not necessarily changed starting from the upper left image slot. That is, in a case where the image slots are specified starting from the upper right of the page display area 202 in S404 or in other cases, the order of changing the arrangement position may start from the upper right image slot in the page display area 202 or any other image slot.

S403 to S406 are substantially the same processing as S302 to S305, and thus, description thereof is omitted.

In S407, the CPU 108 determines whether the piece of rectangle information created in S406 is based on an image slot having the identical attribute with the preceding piece of rectangle information. If the determination is YES, the CPU 108 advances to S408; if the determination is NO, the CPU 108 advances to S409. If the piece of rectangle information is a first piece of rectangle information, the CPU 108 advances to S409.

If the CPU 108 determines in S408 that the piece of rectangle information created in S406 is not based on an image slot having the identical attribute with the preceding piece of rectangle information, the CPU 108 starts a new line and arranges the rectangle information in the printable area 213. Here, the CPU 108 automatically arranges the rectangle information such that the rectangle information does not overlap rectangle information that has been already arranged and falls within the printable area 213 in the page display area 202 by the automatic arrangement mode. For example, the rectangle information is arranged in the upper left of the page display area 202 on a page.

In S409, the CPU 108 automatically arranges the rectangle information created in S406 such that the rectangle information does not overlap rectangle information that has been already arranged and falls within the printable area 213 in the page display area 202 by the automatic arrangement mode. For example, the rectangle information is arranged in the upper left of the page display area 202 on a page.

S410 to S414 are substantially the same processing as S307 to S311, and thus, description thereof is omitted.

As described above, according to this embodiment, when the automatic arrangement mode is applied in a case where a crop mark is set for an image slot of a selected image, the image slot including the crop mark is automatically arranged in the printable area 213 in the page display area 202. Thus, the set crop mark does not overlap the non-printable area 214. Therefore, a user does not have to move the crop mark or the image to a position within the printable area while checking a print preview, and thereby, the user's operation load can be reduced. Image slots are further classified by taking into account, whether an image is inserted into an image slot, the size of the image slot, the presence or absence of a crop mark, the assignment method of the image inserted into the image slot, or the position of the crop mark set for the image slot, and the like, and the image slots are automatically arranged for each identical attribute. Therefore, the user can easily grasp settings of the image slots.

OTHER EMBODIMENTS

Although the CPU 108 starts the processing in response to the automatic arrangement mode set in the print setting portion 206 being selected in the above embodiments, the CPU 108 may also start the processing in response to a crop mark being set for an image slot selected in the page display area 202. In addition, the CPU 108 may also start the processing in response to a crop mark being set for all the image slots displayed in the page display area 202. Furthermore, the CPU 108 may also start the processing in response to an image being inserted into an image slot for which a crop mark is set in the page display area 202. Furthermore, the CPU 108 may also start the processing in response to an image being inserted into all the image slots for each of which a crop mark is set in the page display area 202.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-058495, filed Mar. 30, 2021, which is hereby incorporated by reference herein in its entirety.

What is claimed is:

1. A control method for an image processing apparatus, the method comprising:
    a first display step of displaying a display area that includes a printable area and a non-printable area, the printable area corresponding to an area to be printed on a recording medium, the non-printable area corresponding to an area not to be printed, and in which at least one image that is a printing target is to be arranged;
    a second display step of displaying a setting area that is an area for accepting an operation for automatically changing, within the display area, a position of the at least one image arranged in the display area, and is an area other than the display area; and
    a changing step of automatically changing, upon accepting the operation on the setting area, a position of a predetermined image arranged in an uppermost portion of the display area and a position of at least part of a crop mark, the part being set above the predetermined image, such that the predetermined image and the at least part of the crop mark fall within the printable area.

2. The control method according to claim 1, wherein a crop mark is set for the at least one image or an image slot.

3. The control method according to claim 2, wherein the image slot is a frame into which the at least one image is inserted when the at least one image is displayed in the display area.

4. The control method according to claim 1, further comprising:
    upon accepting an operation for automatically changing, within the display area, a position of the at least one image arranged in the display area, in a case where the at least one image comprises a plurality of images,
    a first changing step of automatically changing, among the plurality of images, a position of an image for which no crop mark is set and that is arranged in the display area such that the image falls within the printable area; and
    a second changing step of automatically changing, among the plurality of images, the position of the predetermined image arranged in the uppermost portion of the display area and the position of the at least part of the crop mark, the part being set above the predetermined image, such that the predetermined image and the at least part of the crop mark fall within the printable area.

5. The control method according to claim 1, wherein, upon accepting an operation for automatically changing, within the display area, a position of the at least one image arranged in the display area, in a case where the at least one image comprises a plurality of images, the plurality of images including an image for which a crop mark is set are classified depending on an attribute, and arrangement of the plurality of images is automatically changed such that the plurality of images arranged for each identical attribute and the crop mark set for the image fall within the printable area.

6. The control method according to claim 5, wherein
    the attribute is a setting size of the image or a setting size of an image slot that is a frame into which the image is inserted when the image is displayed in the display area, and among the plurality of images, images having a similar setting size are classified into an identical attribute.

7. The control method according to claim 6, wherein the setting size is a size set as a value for the image or the image slot.

8. The control method according to claim 5, wherein the attribute is an assignment method of assigning the image to an image slot that is a frame into which the image is inserted when the image is displayed in the display area.

9. The control method according to claim 8, wherein
the assignment method includes a first assignment method and a second assignment method, and
the plurality of images are classified into either attribute of the first assignment method and the second assignment method on the basis of either the first assignment method or the second assignment method by which the image is assigned to the image slot.

10. The control method according to claim 9, wherein the first assignment method is a method in which a setting size of the image is changed such that four sides of the image fall within the image slot and the image is inserted into the image slot.

11. The control method according to claim 9, wherein the second assignment method is a method in which a setting size of the image is changed such that either top and bottom two sides or left and right two sides of the image fall within the image slot and the image is inserted into the image slot.

12. The control method according to claim 5, wherein
the attribute is a position of the crop mark, and
the plurality of images are classified depending on whether the crop mark set for the image or an image slot that is a frame into which the image is inserted when the image is displayed in the display area is set at a position from the image or the image slot with a predetermined distance therebetween.

13. The control method according to claim 1, wherein, upon accepting an operation for automatically changing, within the display area, a position of the at least one image arranged in the display area, a coordinate in a length direction of a page at an intersection point of a crop mark set above an image corresponds to a coordinate in the length direction of the page at an intersection point of a crop mark set above an adjacently arranged image.

14. The control method according to claim 13, wherein each of the intersection points of the crop marks is an intersection point of a straight line in the length direction of the page and a straight line in a width direction of the page in a corresponding one of the crop marks.

15. The control method according to claim 1, wherein, upon accepting an operation for automatically changing, within the display area, a position of the at least one image arranged in the display area, a straight line in a width direction of a page of a crop mark set for an image overlaps a straight line in the width direction of the page of a crop mark set for an adjacently arranged image.

16. An image processing apparatus comprising:
a first display unit configured to display a display area that includes a printable area and a non-printable area, the printable area corresponding to an area to be printed on a recording medium, the non-printable area corresponding to an area not to be printed, and in which at least one image that is a printing target is to be arranged;
a second display unit configured to display a setting area that is an area for accepting an operation for automatically changing, within the display area, a position of the at least one image arranged in the display area, and is an area other than the display area; and
a changing unit configured to automatically change, upon accepting the operation on the setting area, a position of a predetermined image arranged in an uppermost portion of the display area and a position of at least part of a crop mark, the part being set above the predetermined image, such that the predetermined image and the at least part of the crop mark fall within the printable area.

17. The image processing apparatus according to claim 16, wherein, upon accepting an operation for automatically changing, within the display area, a position of the at least one image arranged in the display area, in a case where the at least one image comprises a plurality of images, the plurality of images including an image for which a crop mark is set are classified depending on an attribute, and arrangement of the plurality of images is automatically changed such that the plurality of images arranged for each identical attribute and the crop mark set for the image fall within the printable area.

18. A non-transitory computer readable storage medium storing a program for causing a computer to execute a control method for an image processing apparatus, the method comprising:
a first display step of displaying a display area that includes a printable area and a non-printable area, the printable area corresponding to an area to be printed on a recording medium, the non-printable area corresponding to an area not to be printed, and in which at least one image that is a printing target is to be arranged;
a second display step of displaying a setting area that is an area for accepting an operation for automatically changing, within the display area, a position of the at least one image arranged in the display area, and is an area other than the display area; and
a changing step of automatically changing, upon accepting the operation on the setting area, a position of a predetermined image arranged in an uppermost portion of the display area and a position of at least part of a crop mark, the part being set above the predetermined image, such that the predetermined image and the at least part of the crop mark fall within the printable area.

19. The non-transitory computer readable storage medium according to claim 18, wherein, upon accepting an operation for automatically changing, within the display area, a position of the at least one image arranged in the display area, in a case where the at least one image comprises a plurality of images, the plurality of images including an image for which a crop mark is set are classified depending on an attribute, and arrangement of the plurality of images is automatically changed such that the plurality of images arranged for each identical attribute and the crop mark set for the image fall within the printable area.

* * * * *